(12) United States Patent
Lowth (10) Patent No.: US 9,664,216 B2
(45) Date of Patent: May 30, 2017

(54) SUPPORT STRUCTURE FOR RADIAL APPLICATION

(71) Applicant: ROLLS-ROYCE PLC, London (GB)

(72) Inventor: Stewart Lowth, Nottingham (GB)

(73) Assignee: ROLLS-ROYCE plc, London (GB)

( * ) Notice: Subject to any disclaimer, the term of this patent is extended or adjusted under 35 U.S.C. 154(b) by 51 days.

(21) Appl. No.: 14/614,868

(22) Filed: Feb. 5, 2015

(65) Prior Publication Data

US 2015/0252825 A1 Sep. 10, 2015

(30) Foreign Application Priority Data

Mar. 4, 2014 (GB) .................................. 1403767.5

(51) Int. Cl.
*G09F 7/18* (2006.01)
*F16B 2/18* (2006.01)
*F16B 2/06* (2006.01)
*F16L 7/00* (2006.01)

(52) U.S. Cl.
CPC ............... *F16B 2/185* (2013.01); *F16B 2/06* (2013.01); *F16L 7/00* (2013.01); *Y10T 24/44256* (2015.01); *Y10T 24/44325* (2015.01)

(58) Field of Classification Search
CPC .... B25B 1/02; B25B 1/04; B25B 5/00; B25B 5/02; F16B 2/185; F16B 2/06
See application file for complete search history.

(56) References Cited

U.S. PATENT DOCUMENTS

| | | | |
|---|---|---|---|
| 1,757,548 A | 5/1930 | Schissler | |
| 4,535,962 A | 8/1985 | Chan et al. | |
| 4,671,500 A | 6/1987 | Mark | |
| 5,448,867 A * | 9/1995 | Wilson | A01G 9/16 52/641 |
| 5,509,336 A * | 4/1996 | Biagiotti | B23B 31/1269 279/109 |
| 5,707,089 A | 1/1998 | Fend | |
| 7,896,088 B2 * | 3/2011 | Guerrero | E21B 4/18 166/206 |
| 8,210,837 B2 * | 7/2012 | Frische | B29C 47/0026 425/380 |

FOREIGN PATENT DOCUMENTS

| | | |
|---|---|---|
| DE | 196 27 841 A1 | 2/1997 |
| EP | 1 081 424 A1 | 3/2001 |
| FR | 2 960 462 A1 | 12/2011 |

OTHER PUBLICATIONS

Jul. 10, 2015 Search Report issued in EP Application No. 15153979.
Jul. 3, 2014 Search Report issued in British Patent Application No. 1403767.5.

* cited by examiner

*Primary Examiner* — Amy Sterline
(74) *Attorney, Agent, or Firm* — Oliff PLC (57) ABSTRACT

This invention concerns a support structure for releasably clamping onto a body relative to a central axis in use, wherein the support structure comprises a plurality of links connected at a plurality of pivots spaced about the axis and an array of contact members depending from the links at angularly spaced locations about the axis, whereby pivoting of the links causes actuation of the contact members in a substantially radial direction relative to the axis such that said contact members communicate an applied contact force about the body in use so as to clamp the support structure to the body via the array of contact members.

17 Claims, 6 Drawing Sheets

SUPPORT STRUCTURE FOR RADIAL APPLICATION

BACKGROUND OF THE INVENTION

The present invention relates to a support structure for clamping onto a body in a radial direction and more particularly, although not exclusively, to a support structure than can hold a body at a plurality of locations on an internal or external surface of the body spaced about a central axis.

There exist a number of applications in which it is necessary to support or clamp a body, such as a machine component or assembly, securely about its periphery. This need exists particularly in the manufacture, inspection, transportation, maintenance and repair/overhaul of rotating machinery in which generally cylindrical or annular components/assemblies are commonplace. Support structures are often required to hold such components in a predetermined orientation such that one or more operations can be performed on the component whilst held fast. Depending on the operation in question, access to the interior and/or exterior of component may be required whilst held.

Figure 1:
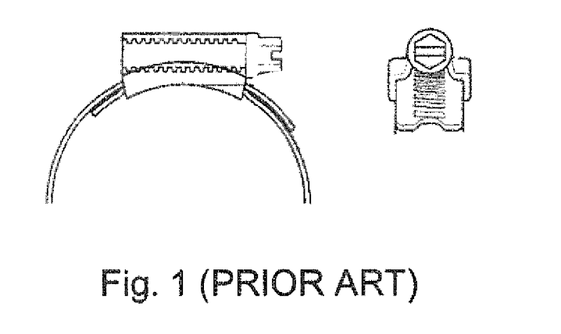
FIG. 1 shows section and end views of one type of clamp according to the prior art.

One example of a support arrangement of this type is a clamping ring shown in FIG. 1, in which a deformable collar in the form of a metal band is placed around an object and a screw thread is used to cause the collar to contract, thereby gripping the exterior of the object about its periphery. Hose clamps provide a conventional form of such supports.

Although cheap and compact, there are a number of problems with such clamping systems. Hose-style clamping is best suited to the external clamping of small diameters, but it offers no facility to internally clamp an annular body. Such clamps are also restricted to exerting relatively low clamping forces, due to the need for a deformable, and therefore thin, metal band, which must be flexible enough to conform to an annular loop of the required diameter. Since the thin metal loop will conform to the component, there is no guarantee that the clamp is maintaining a truly circular shape, thereby meaning that circularity can be a problem, particularly when supporting thin-walled components and/or when tolerances are particularly tight.

Figure 2:
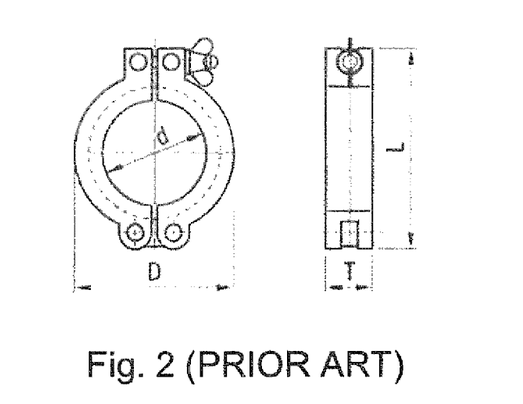
FIG. 2 shows plan and end views of a hinged clamp according to the prior art.
Figure 3:
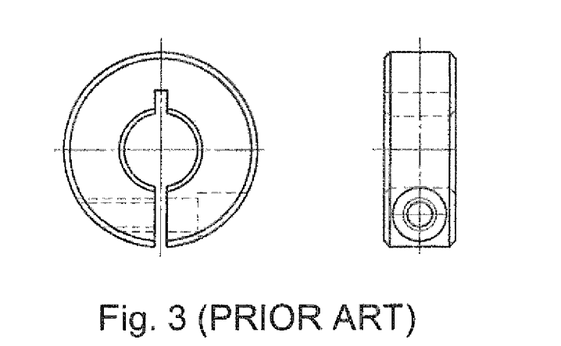
FIG. 3 shows plan and end views of another type of circumferential clamp according to the prior art.

Another example of a tool for clamping cylindrical objects is a hinged pipe clamp (as shown in FIG. 2 or a slotted shaft collar as shown in FIG. 3. These clamps have a centre aperture that is slightly larger the object to be held. A portion of the circumference removed to provide a gap between the opposing ends of the collar and a bolt is used to reduce the size of the gap and thereby clamp the collar onto the body within the central aperture. This type of clamp can only clamp onto an external surface of the body and can only accommodate bodies within a very narrow band of deviation.

Conventional collar clamps are also prone to clamping at opposing discrete pinch points, e.g. at two points perpendicular to the clamping screw, rather than evenly about the entire periphery of the body. This can cause significant point loading of the clamping force which causes unwanted stress, and potentially deformation, in the clamped body.

Whilst a number of variations on the above clamp types have been developed for specific applications or components, the above problems generally persist and thus any single clamp is typically tailored to accommodate bodies which display only a very small degree of deviation from a nominal profile.

It is an aim of the present invention to provide a support structure that can mitigate or overcome one or more of the above-identified problems. It may be considered an aim of the invention to provide a support that provides more uniform and/or adaptable clamping of a body, for example whilst allowing access to the clamped body.

BRIEF SUMMARY OF THE INVENTION

According to a first aspect of the invention there is provided a support structure for releasably holding a body relative to a central axis in use, wherein the support structure comprises a plurality of links connected at a plurality of pivots spaced about the axis and an array of contact members depending from the links at spaced locations about the axis, whereby pivoting of the links causes actuation of the contact members in a direction towards or away from the axis such that said contact members communicate an applied contact force about the body in use so as to clamp the support structure to the body via the array of contact members.

The support structure of the invention may advantageously share the applied load substantially evenly over an opposing surface of the body. The load may be shared via the links, for example through the pivots. The support structure may surround or enclose the axis.

The contact members may be actuated in a generally or substantially radial direction relative to the central axis. The contact members may each be actuated concurrently and/or equally by the links, for example by an equal distance so as to distribute an applied clamping load evenly between the contact members.

The plurality of links may define or comprise a continuous/closed network or circuit about the axis. The plurality of links may enclose the axis. The plurality of links may define or comprise a pin-jointed framework about the axis.

Any or any combination of the plurality of links, pivot points or contact members may be arranged in an annular array about the axis.

Each link may be pivotably attached at a plurality of pivot points along its length. A first pivot point may be a radially inner point and a second pivot point may be a radially outer point. Actuation of the support structure may actuate the links so as to alter the radial distance between the pivot points. In some examples of the invention, each link may be attached at three pivot points along its length. At least one pivot point may be located at an end of the link.

Each link is typically obliquely angled, at least in part, relative to a radial or tangential direction relative to the axis.

The links may be bent, e.g. arcuate or angled in form, for example comprising first and second portions which meet at a corner or apex. An obtuse angle may be formed between the first and second portions. Each link may be generally bowed, chevron-like or L-shaped.

Each contact member may be elongate or eccentric in form.

Each contact member may comprise a resiliently deformable material or portion. Each contact member may comprise a rigid portion, for example for mounting to (or integral with) the links, and a resiliently deformable portion depending therefrom.

In one example, the contact members may be pivotably attached to the links. Each contact member may be attached to a pivot point, such as a radially inner or outer pivot point. Each contact member may be attached to a common pivot point between two links. Each contact member may be attached between two pivot points. Such an arrangement may advantageously maintain a radial alignment of the contact member. Each contact member may be slidably mounted relative to a pivot point, for example to allow constrained movement between the contact member and pivot point. The contact member may comprise a slot, runner or slider portion, for example to allow substantially liner or one-dimensional movement between the pivot point and the contact member.

In another example, each contact member may be resiliently or rigidly attached to a link or integral with a link. Each contact member may depend from an end of a link. A resiliently deformable material or portion may be interposed between the contact member and link. This may help to avoid overloading of any one contact member and/or may allow the support system to be tolerant of geometrical variation between bodies to be supported.

Each link may be actuated relative to an adjacent link in a scissor-like action in use.

According to examples of the invention, the plurality of links may comprise two sets or arrays of links arranged about the axis. Each link in an array may be attached at first and second spaced points along its length to adjacent links (e.g. first and second adjacent links) in its array. Each link may be attached at an intermediate location between the first and second points to a link of the other array of links. A network of interconnected link arrays may be provided. The first and/or second points may or may not be at an end of the link, for example so as to define an array of links connected end to end. The intermediate location may be at a central location along the link, for example at a corner or arcuate portion of the link. Each link in one array may be pivotally attached or obliquely angled relative to an adjacent link in the other array. The first and second array may be substantially identical but angularly offset about the axis. The first and second array may be out of phase, for example with the radially innermost and outermost points of the links alternating between the first and second arrays in a circumferential direction about the axis.

According to an example of the invention, the links may be mounted to a common actuator. A single actuator may be provided for the support structure. Alternatively, a plurality of actuators may be provided, for example one for each contact member. The, or each, actuator may extend between a plurality of links, for example between pivot points thereof. The, or each, actuator may output a linear driving motion, such as for example an extension or compression motion.

The support/actuator may be annular or shaped to correspond to the contour of a body to be supported. The support/actuator may comprise a pair of adjacent or concentric members. The members may undergo relative movement in order to actuate the links/contact members in use. Each link may be mounted, e.g. pivotably mounted, to only one of the members. Each link may have an adjacent link, to which it is pivotably attached, and the adjacent link may be mounted to the other of the members. One member may be rotatable or slidable relative to the other.

Relative movement between the members thus causes the contact member, e.g. a free end of the contact members, to mover radially inwardly or outwardly, dependent on the direction of relative movement.

The plurality of links and contact members may be provided in a row. The row may be a first row and the support structure may comprise a plurality of rows, each having a plurality of links and contact members. The rows are typically mounted about the same central axis. The contact members in each row may be actuated in a common or substantially parallel direction. Each row may be connected to another row, for example in an adjacent or spaced manner along the axis.

According to a further aspect of the invention, there may be provided a method of supporting a body using the support structure of the first aspect.

Any of the essential or preferable features defined in relation to the first aspect of the invention may be applied to the further aspect.

BRIEF DESCRIPTION OF THE DRAWINGS

Practicable embodiments of the invention are described in further detail below by way of example only with reference to the accompanying drawings, of which.

DETAILED DESCRIPTION OF THE INVENTION

The present invention is concerned with the ability to grip and/or support a body at multiple locations about an internal or external peripheral surface. The invention may find use for fixturing of a workpiece during manufacturing operations such as machining, cleaning, etc or else for holding a component or assembly during an assembly process. Additionally or alternatively, the invention may find use in support of a component or assembly for inspection, testing, movement, manipulation/lifting, transportation, repair or similar processes. Thus the invention may be considered to relate to the handling of bodies, typically for engineering or display purposes. Accordingly the apparatus of the invention may be referred to as a jig, support, clamp, fixture, mount or similar term dependent on the context of use. In the examples of the invention below the term "clamp" is used for conciseness to encompass any such uses.

Figure 4:
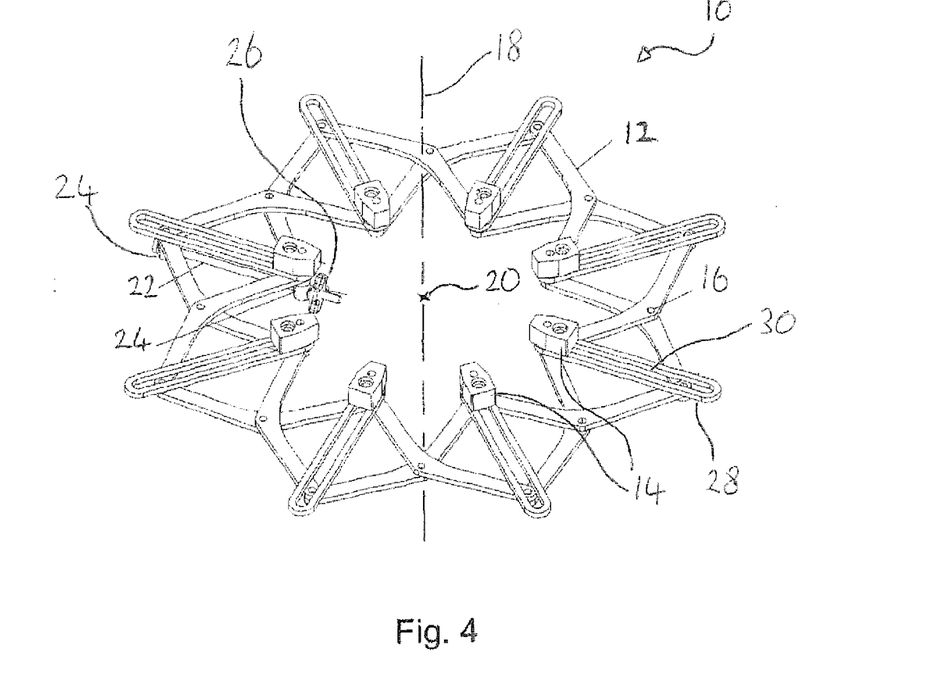
FIG. 4 shows a three-dimensional view of a clamp according to one example of the invention.
Figure 6A:
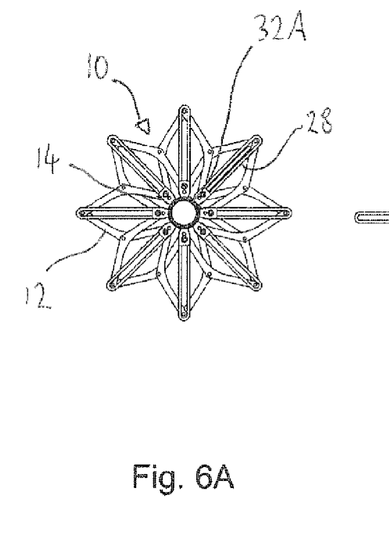
FIGS. 6A and 6B show respective plan views of use of the clamp on bodies of varying lateral dimension.
Figure 6B:
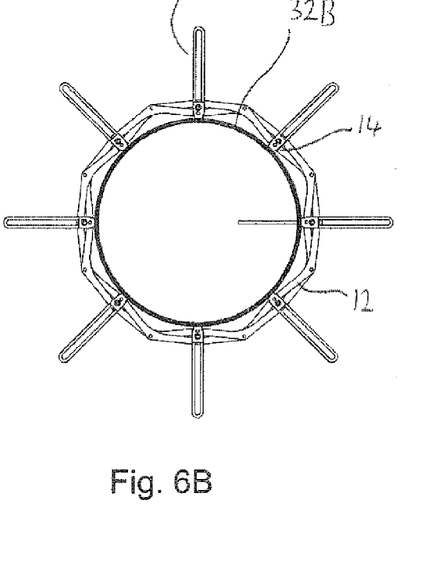

Turning firstly to FIGS. 4 and 6, there is shown a clamp 10 according to an example of the invention, in the form of a linkage clamp. The clamp 10 comprises a plurality of linkages 12 attached together at pivot points 16, for example by a pin so as to allow relative rotation between adjoining links 12. The pivot points may otherwise be formed by a projection in on link being received in a corresponding recess in an adjacent or opposing link.

A plurality of clamp members 14 are attached to pivot points 16 to contact a body to be held in use.

The links are connected so as to form an interlinked network. This is achieved in this example by each link being attached at its opposing ends to the end of two adjacent links. Each link is also attached part-way along its length, typically half-way, to a further link. Thus each link has a pivot connection 16A, 16B towards each end thereof and a further intermediate pivot connection 16C. The intermediate pivoting connection 16C is made with an intermediate connection of a further adjacent link. Each link has three connection points to three adjacent links.

All pivot points in the network allow pivoting of the link members 12 about axes which are substantially parallel with central axis 18.

Using this arrangement, a closed annular network of links is arranged about a central axis 18, i.e. which passes through a central point 20 of the annular structure. The annular network is generally arranged in a plane extending radially out from the axis 18 and may be actuated in a radial direction as will be described below. The network of links comprises two circumferentially-extending arrays of links, wherein links contained in one array are attached end to end, i.e. at pivot points 16A, 16B, with adjacent links in the same array. The links in one array are pivotably connected to the links of the other array part way along their length, i.e. at the intermediate pivot point 16C.

The links in each array are attached to adjacent links, e.g. at each end thereof, in an opposing sense. That is to say each link will form an interior angle at one end thereof with an adjacent link that is greater than 180° (i.e. a reflex angle) and will form an interior angle at the other end thereof with another adjacent link that is less than 180° (i.e. an acute or obtuse angle). In this manner, each array forms a wave-like pattern in a circumferential direction, varying from maximum to minimum radial distances in a repeating pattern about axis 18. The two arrays of links 16 are out of phase, typically perfectly out of phase, such that an inner pivot point for one array lies on the same radial line from central point 20 as an outer pivot point of the other link array.

Each link is elongate and bent in form, i.e. arm-like in shape. The intermediate pivot point in this example is located at an apex or elbow of the link. In this example the links are chevron-shaped but may otherwise be L-shaped or curved/arcuate in form, e.g. crescent shaped.

The links are typically metallic but could be plastic for lower load applications. In this example, the links are formed of a relatively thin-walled material such that the depth of the link is significantly less (e.g. an order of magnitude or more less) than the width or length dimension.

An actuator in the form of a threaded bar or rod 22 is attached between links of the different arrays, i.e. between links that share an intermediate pivot attachment.

The actuator may potentially be attached to the links at any point spaced from the intermediate pivot point 16C. However it has been found convenient to affix the actuator 22 between end connections of the links, thereby forming an actuator which shares a pivot connection with two different links at each end thereof.

The actuator extends between end stops or post formations 24, such that an applied tension or compression in the actuator 22 either pulls the posts 24 together or drives them apart respectively. The actuation force in this example is applied by rotation of a screw or nut member 26 along the actuator. This torque input is applied manually in this example but may be driven in other examples. In further examples it is to be understood that other types of actuator could be substituted for that shown in FIG. 4 provided they can generate the necessary extension/retraction action. Examples of suitable actuators include piston-and-cylinder arrangements such as pneumatic or hydraulic actuators, electric motor actuators (e.g. with rotational or liner screw thread drive), other linear electrical actuators (such as electromagnetic or piezoelectric drives), or shape memory alloy actuators.

Each link 12 may be identical in form, for example when providing a clamp for attaching to a circular profile portion of a body to be clamped. In other examples the links may vary in form for example to provide a clamp that holds an elliptical body surface.

A series of clamp members 14 are attached to the pivot points in the link network between the ends of adjacent links 12. The clamp members 14 in this example comprise a clamping head or block formation. The clamp member may be formed of a different material to the links and may comprise a polymer material or other material that is softer or otherwise more resiliently deformable than the links. The clamp member could for example comprise a high-density polymer such as polyethylene or an elastomer. In other examples, it is possible that a traditional mechanical pincer or fixturing clamps can also be used with, or instead of, the clamping blocks. This may allow improved grip on thin-walled components.

The clamp members 14 all lie at a common radial distance from the axis 18 in this example, e.g. along a common circle trace, but could lie in the trace of an ellipse in other examples.

Figure 5:
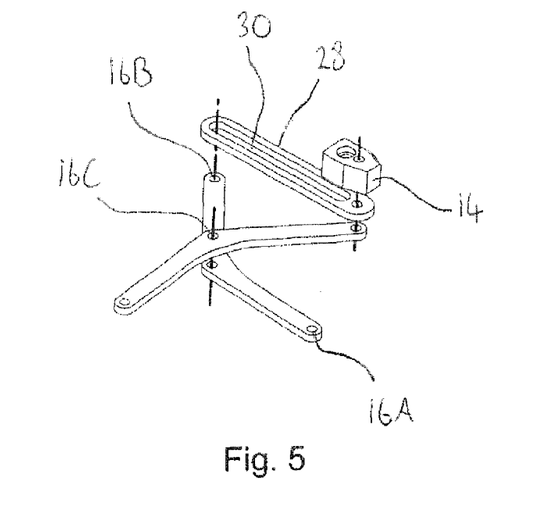
FIG. 5 shows an exploded view of a portion of the linkage of FIG. 4.

A clamp member guide 28 is provided for each clamp member 14 and comprises an elongate guide or runner member. The guide 28 extends from each clamp member 14 in a radial direction to a further pivot point of the link network that is spaced form the clamp member 14. In this example the guide 28 receives a protruding member (not shown) that depends from pivot point 16B. The guide 28 is thus constrained to a radial alignment but accommodates movement of the pivot point 16B along the guide in a manner akin to a runner or slider during actuation of the clamp. The guide has an elongate slot 30 along at least part of its length for this purpose.

The actuation of opposing link portions towards or away from one another causes a scissor-like action about the intermediate pivots in the link network, thereby causing common actuation of the clamp members 14 in a direction towards or away from the axis 18 depending on the direction of actuation of the actuator 22, 26. The clamping action is performed by increasing or reducing the radial distance between pivot points 16A, 16B of the same or adjacent links 12 throughout the link network (e.g. thereby sliding the outer pivot 16B through the guide component 28). This changes the diameter of the ring, clamping any circular component centrally.

FIGS. 6A and 6B show different usage configurations of a common clamp design 10. Here it can be seen that the clamp 10 can be actuated to clamp onto, and thereby hold fast, the outer surface of cylindrical or annular bodies 32A, 32B with significant variation in diameter. For example the same device 10 as shown in FIG. 6A could clamp onto a body with a diameter anywhere between 50 and 400 mm in diameter. This provides just one example and other examples could be tailored to accommodate different ranges as necessary. This variation in clamping range could provide a universal clamp tool that can be used across a range of different components or a family of common components. Additionally or alternatively, the clamp can accommodate usual manufacturing tolerances far better than prior art designs. In some examples, the clamp may be tailored to operate over a far smaller range of variation.

Figure 7A:
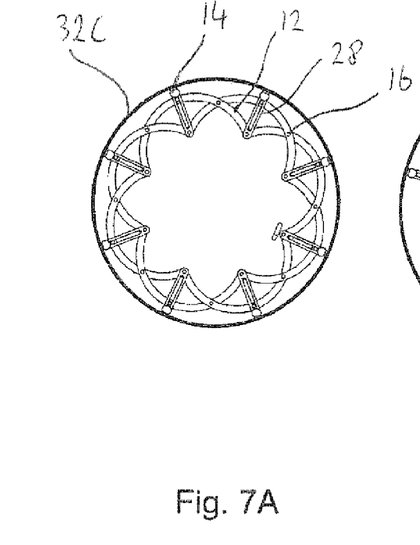
FIGS. 7A and 7B show respective plan views of another example of clamp according to the invention when used for internal clamping of different sized bodies.
Figure 7B:
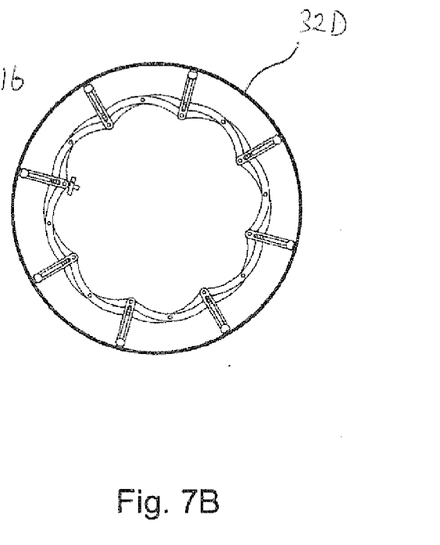

In FIGS. 7A and 7B another example is shown in which the clamp members 14 are mounted at radially outwardly facing locations of the link network, rather than the inward facing clamping arrangement of FIGS. 4-6. Thus the arrangement of FIG. 7 can be used to clamp against the interior surface of an annular body 32C or 32D. Such examples of the invention may be otherwise similar to those described above. However in the example of an outwardly applied clamping force, it is in many ways preferable that the clamp members 14 are mounted to the guides 28 and not directly to pivot points 16. The guides 28 are attached to a relevant pivot point, typically an inner pivot point 16A. The clamp members 14 may be mounted to the opposing, or radially outermost, end of the guides. Thus the guides can extend and retract in a radial direction in order to provide the desired variation in clamping diameter.

Also in the example of FIGS. 7A and 7B, the links comprise arcuate, rather than angled, links 12. However arcuate or angled links could be substituted in either example of the invention as necessary.

In examples of the invention for internal clamping, it may be beneficial to tune the link network to operate over a range of diameters that is smaller than the maximum possible range achievable. This may therefore allow a reduced profile of the clamp, allowing improved access to the interior of the body whilst clamped.

Figure 8A:
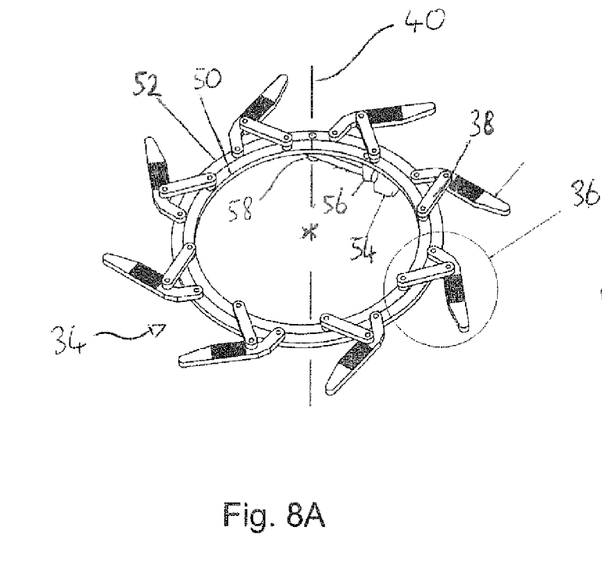
FIGS. 8A and 8B show three-dimensional views of a clamp according to a further example of the invention and a detail view of a link portion thereof respectively.
Figure 8B:
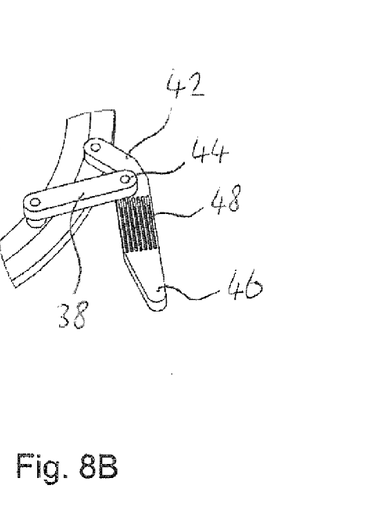
Figure 9A:
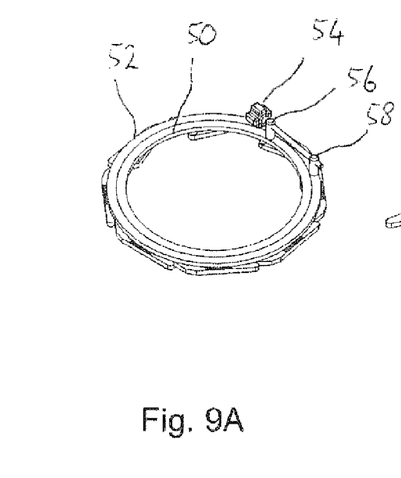
FIGS. 9A and 9B show the clamp of FIG. 8 in retracted and extended conditions.
Figure 9B:
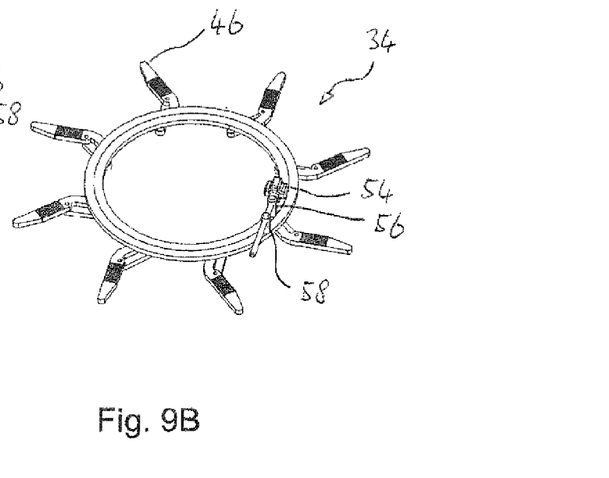

Turning now to FIGS. 8 and 9, there is shown a further example of a clamp 34 according to the invention. The clamp 34 shares with the above-described embodiments the concept of using pivoting link members to actuate a plurality of clamp members. However the examples of FIGS. 8 and 9 use a different actuation or transmission system to cause the clamp members to apply a clamping force.

The clamp 34 comprises a plurality of linkages 36 disposed about a common, central axis 40. The linkages are typically, although not essentially, evenly spaced about the axis 40. The linkages 36 are shown in detail in FIG. 8B and comprise a first link 38 and a second link 42, pivotably connected together about pivot point 44. The pivot 44 is provided at the end of the first link 38 but part way along the length of the second link 42.

The second link 42 is bent, i.e. curved or angled, in form and extends towards a free end at which is formed a contact member 46. The contact member 46 may be rounded at its end. In this example, the contact member is integral with the link 42 but may otherwise be attached thereto. The contact member 46 could comprise a resiliently deformable material at its tip, for example of the kind described above. However in this example the link 42 and contact member 46 are metallic.

A degree of resilience is provided in the contact member by a flexure 48 disposed between the link portion 42 and the contact member portion 46. The flexure 48 may comprise a portion of the link and/or contact member having reduced strength/stiffness or increases flexibility. This is achieved in the present embodiment by provision of a plurality of elongate cut-outs or slots along a portion of the contact member spaced from its free end. The reduced material in the flexure region 48 allows limited, typically elastic, deformation of the flexure in response to a load at the contact member tip. This can thus allow a substantially evenly distributed clamping load to be applied through the contact members 46 despite small errors or deviations in a body to be clamped. The slots help to ensure that the deformation of the flexure 48 is maintained within the elastic limit of the flexure. In other embodiments, the flexure could be provided by way of an intermediate material interposed between the contact member 46 and the link 42.

Any such flexures could also be provided for the clamping members of FIGS. 4-6, in addition to, or instead of the resilient clamping head material.

An end of each of links 38 and 42 is pivotably mounted to an actuation structure. The actuation structure comprises a pair of adjacent/concentric members 50, 52 for actuating the linkages 36. Each of the links 38 are pivotably attached to the first, or inner, member 50, whereas each of the links 52 are pivotably attached to the second, or outer, member 52. In this example, the members 50, 52 are adjacently mounted in a manner that permits relative rotation, i.e. constrained one-dimensional motion, there-between about axis 40.

An actuator 54 is provided to drive relative movement between members 50 and 52 in use. In this example, the inner member 50 is rotatable relative to the outer member 52.

The actuator 54 is of a type described above and has a first post 56 mounted to the member 50 and a second post 58 mounted to the member 52. The actuator 54 drives the posts 56, 58 together or apart by way of extension/contraction of an actuation member there-between (such as a threaded rod as described above). This causes relative sliding movement between the rings 50, 52 to thereby transmit the actuation force substantially evenly through each linkage 36. Relative motion between links 38 and 42 causes the contact member 46 to pivot radially outwardly or towards axis 40 depending on the direction of actuation by actuator 54. Actuation of the linkages 36 in this manner allows the clamping member to be brought into contact with an annular body such that an applied actuation force is transmitted to the body as a clamping force between the clamp members 46.

It will be appreciated that the members 50 and 52 serve as common links between linkages 36 of the clamp structure so as to allow communication of a clamping force there-between in a manner akin to the link network of FIGS. 4-7. Thus the members 50, 52 may also be referred to as links. The embodiments of FIGS. 8 and 9 could be altered to clamp radially inwardly, rather than outwardly simply by altering the links and contact member to depend radially inwardly of the rings 50, 52. Thus it is possible to clamp onto an exterior or interior circumferential surface of a body.

Furthermore, whilst the contact members/links in the above embodiments are shown as being elongate in form, it is possible that eccentric members could also be used to provide varying clamp geometry based on angular orientation.

Figure 12:
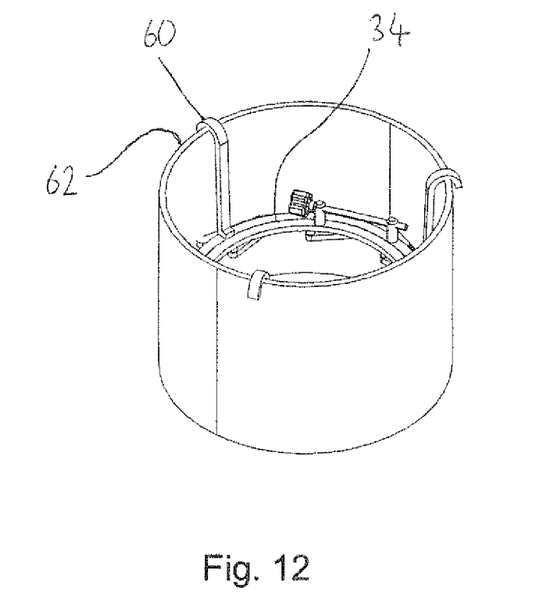
FIG. 12 shows a three dimensional view of a clamp according to the invention in one example of use.

The clamp 34 is shown in fully retracted and extended conditions in FIGS. 9A and 9B respectively. FIG. 12 shows a usage example of the clamp 34 in which a plurality of alignment members 60 depend from the clamp in order to locate the clamp relative to a body 62 in use. The alignment members 60 take the form of hooks that are arranged to hook over an end of the body 62 and thus locate the clamp 34 at a predetermined distance from the body end for clamping. One or more hook or other alignment member could be provided for any embodiment of the invention. Flexible straps or webbing could be attached at a suitable location to the clamp in other examples.

In any example of the invention, the clamp member terminates at an end which is to be pressed against a surface of a body to be clamped. The actuation mechanism of any embodiment is simply operated in the reverse direction to allow de-clamping and removal of the clamp.

In the above examples, eight clamp members have been proposed to provide good distribution of a clamping force about an annular body. However the number of clamp members could be increased or decreased as desired. A different number of clamping members may also accommodated different profiles of body. For example, a clamp with four contact members could be tailored to accommodate a body which is rectangular or box-section in shape. Similarly, increased numbers of clamp members could be used to accommodate polygonal shapes with a larger number of faces. The number of link members and/or pivot points used in the clamp may be altered accordingly.

Figure 10A:
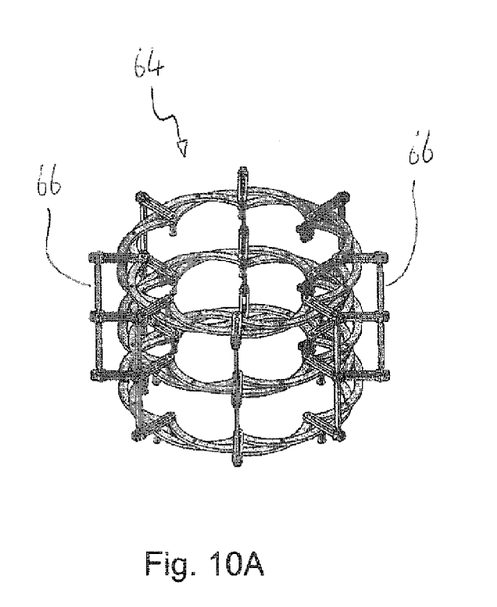
FIGS. 10A and 10B show respective three-dimensional views of a further example of the invention providing a three-dimensional clamp array.
Figure 10B:
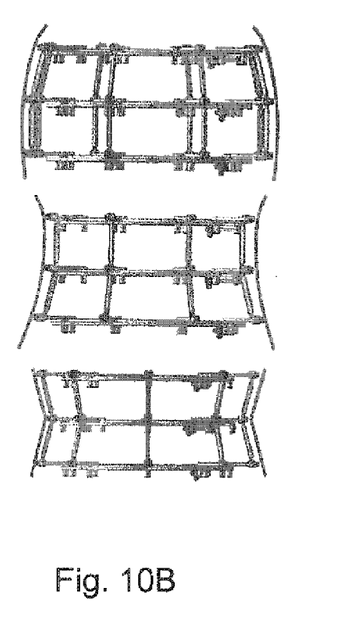
Figure 11A:
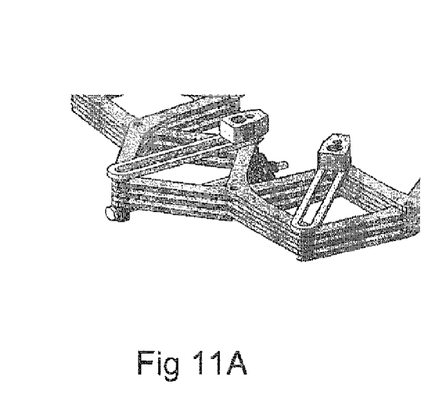
FIGS. 11A and 11B show two further examples of clamps according to the invention.
Figure 11B:
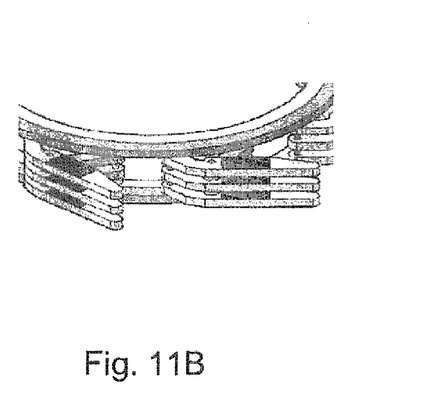

Turning now to FIGS. 10 and 11, there are shown further examples of the invention, in which a plurality of clamp structures of the type described above are used in series.

In FIG. 10, there is shown a series of three clamps 10 arranged about a common axis. The clamps 10 are spaced in the direction of the axis so as to form a three-dimensional clamping structure 64. The clamps 10 thus define a series of clamp rows in the clamp structure 64. The clamps 10 are connected by intermediate links or spacers 66, which hold the clamps at a predetermined spacing. The spacer arms 66 are provided between the clamp members 14 of the adjacent clamp rows but could additionally or alternatively be provided between pivot points in the adjacent rows.

Each clamp may use in unison in one example of the clamp structure 64. In another example, as shown in FIG. 10B, the spacers could be pivotably mounted between clamp rows so as to allow one row to be actuated independently or to a different degree to another row. Thus annular bodies which vary in diameter or sectional profile along their length can be accommodated, e.g. to allow clamping about a converging/diverging annular body. Multiple clamps 34 could also be used in this manner to provide different clamp rows in a three-dimensional clamp structure.

In FIG. 11A, multiple link networks have been rigidly attached together at their corresponding pivot points to act in unison to drive a single array of contact members. Such a stacked arrangement could allow a greater clamping force to be applied through each clamp member. In FIG. 11B, the stacking of linkages 36 in series allows multiple clamp members to be actuated for each linkage, again increasing the clamping force that can potentially be applied and also the axial distance over which clamping contact is made.

Figure 13:
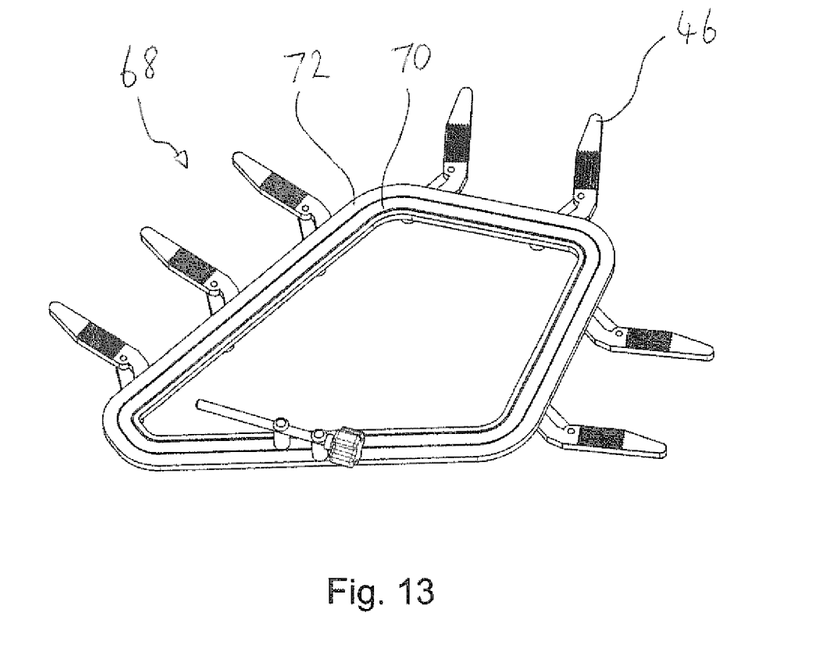
FIG. 13 shows a further example of the invention for clamping bodies which are of irregular or non-circular profile.

The above described embodiments generally allow clamping of cylindrical or annular components as well as regular polygonal bodies, for example being square, hexagonal, octagonal, etc in section in a region to be clamped. All such shapes may be defined in relation to a central axis through the body, about which the body is symmetrical. In FIG. 13, there is shown a variant 68 of the clamp 34 which would also allow clamping of irregular section profiles of a body, either internally or externally. In this example, the clamp 68 has concentric/adjacent members 70, 72, in place of the rings 50, 52 described above.

At least one member 70, 72 may be rigid and conform to the general profile of the body section to be clamped but the profile of the rigid member may be enlarged or reduced in size. The other of members 70, 72 comprises a deformable member, such as a chain, belt, cable or similar which is immediately adjacent the rigid member and follows the profile of the rigid member. The remaining feature of the clamp variant 68 may be substantially as described above in relation to clamp 34. Thus it will be appreciated that the clamp 68 may be tailored to suit a significant variety of irregular and regular body section profiles. Furthermore, such an arrangement could also be stacked or otherwise arranged in a number of rows, in which the profile of the rigid member 70, 72 in each row is different. This may allow conformance to significant variation in body profiles.

The present invention advantageously allows considerable clamping forces to be generated on any size of circular component. If needed the linkages can be made thicker to increase their strength, or several can be stacked so that the system can withstand larger clamping forces. The use of stiff linkages also allows the design to resist both tensile and compressive clamping forces, making the design capable for clamping both internally and externally. The rigid nature of the proposed clamping method also ensures the clamping system maintains its desired alignment of clamping members; this is especially useful when clamping easily deformed, e.g. thin-walled components.

Whilst use of one or more alignment member has been proposed above to securely hold the clamp in place during clamp actuation, it is also possible that the linkage system of any clamp could be spring loaded, such that the clamp is initially deployed and held in place against a component to be clamped by the tensile/compression force of the spring (s). The actuator can thus be operated manually or by drive means whilst the clamp is initially held in place under the spring force.

Multiple clamps of the kind described above may be used concurrently, for example to clamp varying locations along a body or else to clamp against both internal and external surfaces of the body at the same time, e.g. in opposing radial directions.

A number of potential and non-limiting advantages of the invention are listed below:

Clamp forces are generated in a consistent direction relative to a central axis for all clamp members The clamp is well suited to large diameter ring and cylindrical assemblies found within jet engines, turbines, pumps and other industrial axial flow machines Very lightweight for the size of the components that can be clamped, this allows for manual handling and in-situ use Clamp systems can be driven/actuated at a single point, making them easy to manually apply Clamp components can be made relatively cheaply using a profile cutting system, e.g. laser, waterjet, flamecut The design can be adapted to clamp both internally and externally The low profile design leaves the body interior open for access The use of flexures allows small amounts of error to be compensated.

In addition to the clamping uses proposed above, the invention may also be used for local damping or stiffening of components, for example during working/machining or fixing (e.g. riveting/bolting) of the component. The clamp could also be used for centring of a component or the creation of a temporary anchor point, e.g. to allow alignment or support of other components or tools, e.g. inspection tools such as armatures, boroscopes, or the like. Furthermore, the clamp may be used as a measuring device or gauge to determine whether a body geometry is acceptable. In such an example, one or more sensor may be provided on the clamp to determine any or any combination of the degree of extension if the clamp members and/or the load experienced by each individual clamp member. The clamp members may thus become measurement probes. One such application would be for measuring circularity of a body.

The invention claimed is:

1. A support structure for releasably clamping onto a body relative to a central axis in use, the support structure comprising:
   a plurality of links connected at a plurality of pivots spaced about the axis; and
   an array of contact members depending from the plurality of links at angularly spaced locations about the axis,
   wherein pivoting of the plurality of links causes actuation of the contact members in a substantially radial direction relative to the axis such that said contact members communicate an applied contact force about the body in use so as to clamp the support structure to the body via the array of contact members, the plurality of links comprising two arrays of links arranged about the axis, each link in each of the two arrays being attached (i) at first and second spaced-apart pivot points along a length of said link to an adjacent one of the plurality of links in a same array, and (ii) at an intermediate pivot point between the first and second pivot points to one of the plurality of links of the other array of links,
   wherein the support structure comprises a contact member guide for each contact member comprising an elongate guide member extending from each contact member in a radial direction to a further pivot point of the link network that is spaced from the contact member, and
   wherein pivoting of the plurality of links causes the pivot point to slide through the contact member.

2. The support structure according to claim 1, wherein the support structure surrounds the central axis, and the links are configured to cause actuation of the array of contact members in unison to and from the axis.

3. The support structure according to claim 1, wherein two or more of the contact members are actuated in substantially opposing directions so as to create an opposing clamping force on the body.

4. The support structure according to claim 1, wherein the plurality of links define a pin-jointed framework enclosing the axis.

5. The support structure according to claim 1, wherein the plurality of links define a repeating annular array about the axis.

6. The support structure according to claim 1, wherein a first pivot point is a radially inner point and a second pivot point is a radially outer point relative to the axis, wherein actuation of the support structure actuates the links so as to alter the radial distance between the pivot points.

7. The support structure according to claim 1, wherein each link is obliquely angled, at least in part, relative to a radial or tangential direction in relation to the central axis.

8. The support structure according to claim 1, wherein each link is elongate in form and arcuate or angled in form along its length.

9. The support structure according to claim 1, wherein a flexure is located in the force path between the links and contact members or wherein each contact member comprises a resiliently deformable portion.

10. The support structure according to claim 1, wherein each contact member depends from a pivot point between the links.

11. The support structure according to claim 1, wherein adjacent links are arranged to undergo relative actuation in a scissor-like motion.

12. The support structure according to claim 1, further comprising a common actuator for causing relative motion between two or more links in the support structure, wherein the relative motion is communicated to the array of contact members concurrently via the remaining links.

13. The support structure according to claim 1, wherein the actuator is arranged to drive relative movement between a pair of concentric links or rings, to which a plurality of further links are pivotably attached.

14. The support structure according to claim 1, wherein the plurality of links comprise in a first row, the support structure comprising a plurality of rows of links or contact members, each row being aligned about the central axis.

15. The support structure according to claim 14, wherein each row is connected to another row by one or more spacer there-between.

16. The support structure according to claim 10, wherein each contact member also depends from an end of the link.

17. The support structure according to claim 1, wherein each contact member depends from an end of the link.

* * * * *